US007933889B2

(12) United States Patent
Smetters et al.

(10) Patent No.: US 7,933,889 B2
(45) Date of Patent: Apr. 26, 2011

(54) METHOD AND SYSTEM FOR METADATA-DRIVEN DOCUMENT MANAGEMENT AND ACCESS CONTROL

(75) Inventors: Diana K. Smetters, Belmont, CA (US); Elizabeth F. Churchill, San Francisco, CA (US); Lester D. Nelson, Santa Clara, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 372 days.

(21) Appl. No.: 11/803,913

(22) Filed: May 15, 2007

(65) Prior Publication Data

US 2008/0288453 A1 Nov. 20, 2008

(51) Int. Cl.
*G06F 17/30* (2006.01)
(52) U.S. Cl. .......................................... 707/708; 707/713
(58) Field of Classification Search .............. 707/3, 708, 707/713
See application file for complete search history.

(56) References Cited

U.S. PATENT DOCUMENTS

| | | | |
|---|---|---|---|
| 6,240,429 B1 | 5/2001 | Thornton et al. ............. 707/500 |
| 6,253,217 B1 | 6/2001 | Dourish et al. ............... 707/500 |
| 6,266,670 B1 | 7/2001 | LaMarca et al. ............. 707/100 |
| 6,266,682 B1 | 7/2001 | LaMarca et al. ............. 707/501 |
| 6,269,380 B1 | 7/2001 | Terry et al. .................... 707/200 |
| 6,308,179 B1 | 10/2001 | Petersen et al. ............... 707/102 |
| 6,324,551 B1 | 11/2001 | Lamping et al. .............. 707/500 |
| 6,330,573 B1 | 12/2001 | Salisbury et al. ............. 707/511 |
| 6,360,215 B1 * | 3/2002 | Judd et al. ......................... 707/3 |
| 6,370,533 B1 | 4/2002 | Edwards et al. .............. 707/514 |
| 6,370,538 B1 | 4/2002 | Lamping et al. .............. 707/102 |
| 6,397,231 B1 | 5/2002 | Salisbury et al. ............. 707/515 |
| 6,430,575 B1 | 8/2002 | Dourish et al. ............... 707/200 |
| 6,535,884 B1 | 3/2003 | Thornton et al. ............. 707/100 |
| 6,562,076 B2 | 5/2003 | Edwards et al. .............. 715/515 |
| 6,647,391 B1 | 11/2003 | Smith et al. ................... 707/100 |
| 2003/0084404 A1 * | 5/2003 | Dweck et al. ................. 715/513 |
| 2003/0097357 A1 * | 5/2003 | Ferrari et al. ..................... 707/3 |
| 2003/0237051 A1 | 12/2003 | LaMarca et al. .............. 715/513 |
| 2004/0044958 A1 * | 3/2004 | Wolf et al. .................... 715/513 |
| 2005/0075745 A1 * | 4/2005 | Fitzgerald ........................ 700/94 |
| 2006/0149606 A1 * | 7/2006 | Goan et al. ......................... 705/7 |
| 2007/0226204 A1 * | 9/2007 | Feldman ............................ 707/5 |
| 2008/0215509 A1 * | 9/2008 | Charlton .......................... 706/11 |

* cited by examiner

*Primary Examiner* — John Breene
*Assistant Examiner* — Dennis Myint
(74) *Attorney, Agent, or Firm* — Park, Vaughan, Fleming & Dowler LLP; Shun Yao

(57) ABSTRACT

A system is provided to facilitate tag-based organization of documents. During operation, the system receives an original user query. The system extends the query to include documents with an IN-tag and exclude documents with an OUT-tag. The system then performs a search based on the extended query to indicate a collection of documents which satisfy the extended query. The system further allows a user to add a document to the collection of documents or remove a document from the collection of documents. Next, the system modifies a tagging property of the document.

10 Claims, 5 Drawing Sheets

METHOD AND SYSTEM FOR METADATA-DRIVEN DOCUMENT MANAGEMENT AND ACCESS CONTROL

BACKGROUND

1. Field of the Invention

Embodiments of the present invention relate to document management. More specifically, embodiments of the present invention relate to a method and system for tag-based document management and access control.

2. Related Art

As the costs of computing power and Internet connectivity become progressively lower, the number of documents a user or organization handles is exploding. At the same time, dramatic drops in storage costs obviate the need to delete those documents. As a result, one often needs to manage and navigate a huge pool of documents to find information.

The sheer number of such documents, and the challenge of finding them easily under a variety of conditions, has prompted a move away from manual document management practices, such as filing of documents in traditional hierarchical file systems. Present document management systems increasingly involve optimized search, which is automatic indexing of the documents and allows fast retrieval based on queries. While such search-based management interfaces are powerful and ameliorate some of the problems engendered by information overload, they do not address a number of concerns.

For example, manual document organization, e.g., copying or moving documents into folders, conveys information about the documents: what documents are related to each other, what documents are relevant to a particular task, etc. Search-based document retrieval makes it difficult for typical users to annotate documents with information implied by their physical organization.

In addition, search-based interfaces do not address many of the other non-organizational functions performed by standard manual organization practices. Particularly, manual organization, e.g., the placement of a file in a given folder or document collection associated with particular properties, is one of the most easily comprehensible and widely used mechanisms for specifying access control policies. Such access control policies specify who is allowed to read, write, or access a given set of documents. While such policies can be applied directly to individual files, in practice it is much more intuitive for a policy to be applied to a collection or folder (e.g., a folder to be shared with a particular group), and documents to be controlled under that policy are simply added to that folder rather than being managed individually.

SUMMARY

One embodiment of the present invention provides a system that facilitates tag-based organization of documents. During operation, the system receives an original user query. The system extends the query to include documents with an IN-tag and exclude documents with an OUT-tag. The system then performs a search based on the extended query to indicate a collection of documents which satisfy the extended query. The system further allows a user to add a document to the collection of documents or remove a document from the collection of documents. Next, the system modifies a tagging property of the document.

In a variation on this embodiment, if the user adds the document to the collection and if the document satisfies the original query, modifying the tagging property of the document involves removing an OUT-tag from the document.

In a variation on this embodiment, if the user adds the document to the collection and if the document does not satisfy the original query, modifying the tagging property of the document involves including an IN-tag in the document In a variation on this embodiment, if the user removes the document from the collection and if the document satisfies the original query, modifying the tagging property of the document involves including an OUT-tag in the document.

In a variation on this embodiment, if the user removes the document from the collection and if the document does not satisfy the original query, modifying the tagging property of the document involves removing an IN-tag in the document.

One embodiment of the present invention provides a system that facilitates tag-based document access control. During operation, the system allows a user to add a tag to a first document that specifies an access-control scheme for the first document or a part thereof. The system then applies the access-control scheme to the first document or the part thereof based on the tag and a state of a computer that stores the document.

In a variation on this embodiment, the tag specifies a time at which the access-control scheme is activated or deactivated and/or a period of time during which the access-control scheme is effective.

In a variation on this embodiment, the tag specifies an event upon the occurrence of which the access-control scheme is activated or deactivated.

In a variation on this embodiment, the access-control scheme specifies one or more users or user groups to whom access to the first document or the part thereof is denied or allowed.

In a variation on this embodiment, the system warns the user when the user issues a command that conflicts with the access-control scheme.

DETAILED DESCRIPTION

Figure 1:
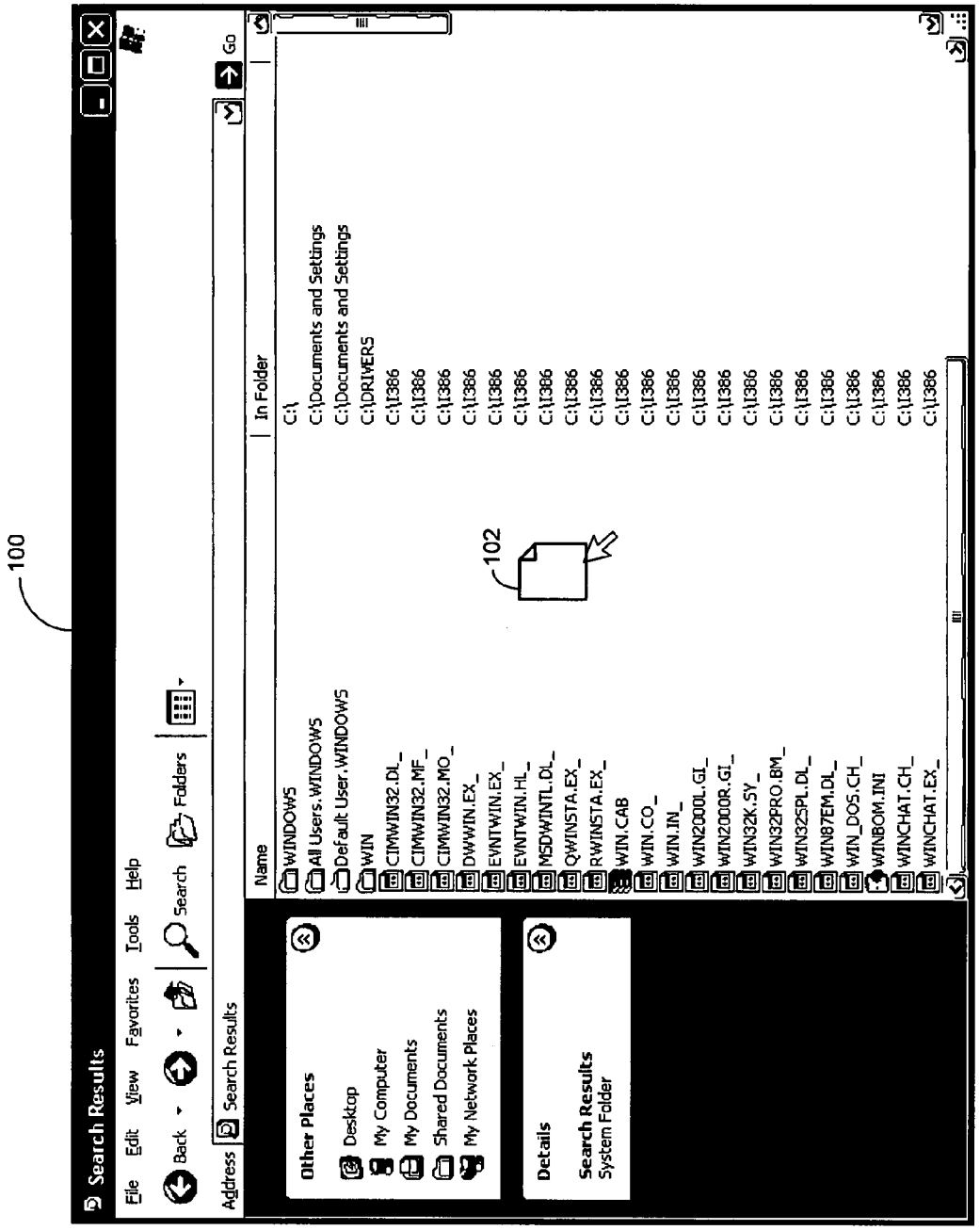
FIG. 1 illustrates an exemplary smarter smart folder which allows a user to drag an item into or out of the folder in accordance with one embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Conventional file-organization user interfaces are based on the assumption that there is only one primary view of the user's underlying data, which corresponds directly to the model used to store the data. For example, a conventional interface only provides views that reflect the single hierarchies of files and folders, or a single view into a specialized database determined by a particular application, such as emails, calendars, etc. Until recently, the only potential additional view offered by most standard windowing platforms has been a very crude search interface. Such a conventional search interface typically provides a dialog-based, slow crawl through the user's data, shows the hits, and allows the user to either open the returned documents or navigate to their actual location.

The use of proactive indexing to enable high-speed search of personal data, often applied in desktop searches, has improved this process slightly. Although local indexing increases the efficacy of conventional document organization systems, the conventional interfaces and views of documents remain inflexible. In this disclosure, such indexing and search operations are referred to as "personal searches."

Currently, some personal-search systems allow "live queries"—queries which continue to return changes to their results without polling. These live queries can be used to construct "smart folders"—collections of documents which appear to the user to be folders, but which in fact are collection of results to a specific query. Smart folders provide a much more intuitive way to organize documents, because a document can simultaneously appear in a number of smart folders. A user can access a document from any smart folder and the changes made to a document therein are reflected to other smart folders which also include the same document. A smart folder can also be referred to as a virtual folder.

Although smart folders are very flexible in organizing and presenting documents, currently there are only limited ways for a user to modify the contents of a smart folder. Since smart folders are based on search results, in general, the only way for a user to modify the collection of documents matched by a search query is to go back and edit the query itself. While different implementations of personal search provide different means of creating and editing queries, these approaches remain somewhat crude and user unfriendly and it can often be very difficult for a user to construct a query that matches all, and only, the set of documents they intend.

Embodiments of the present invention provide a "smarter smart folder" that allows users to seamlessly combine manual grouping of documents with search-based collections. Beginning with a user-generated smart-folder query that approximately matches a set of documents to be grouped, the system provides the ability for the user to manually modify the set of documents contained in the smart folder to include desired documents that do not match the query, and/or to exclude undesired documents that accidentally match the query. The system does this by automatically extending every query associated with a smart folder in a specified manner. For each such query, the system generates two additional tags, an IN-tag and an OUT-tag. These tags might be automatically generated, or derived from some user-specified property in a way that allows them to be also manually manipulated, e.g., added to additional documents, by the user.

Furthermore, the original query is automatically modified in such a way that, in addition to documents matching the query terms, documents tagged with the corresponding IN-tag are included in the results, and documents tagged with the corresponding OUT-tag are excluded. This modification can be done using standard techniques of Boolean logic, resulting in an "extended query." It then becomes possible to implement an interface that allows the users to intuitively "fine tune" the results of their query to match exactly the set of documents they intend, with minimal effort on their part. For example, the "folder-like" visualization interface common for most smart folder systems can be extended to allow manual manipulation of the query result set as follows—if a user drags a document into a smart folder using a GUI, the system modifies the tag set on the document by adding the corresponding IN-tag to or removing the corresponding OUT-tag from the document, so that the document now matches the extended query and appears in the smart folder. If a user drags a document out of the smart folder using the GUI, the system modifies the tag set on the document by adding the corresponding OUT-tag to or removing the corresponding IN-tag from the document, so that the document now fails to match the extended query and no longer appears in the smart folder.

Note that in this disclosure a tag refers to a piece of descriptive data which can be added to a document, and can specify a document property or an operation to be performed on the document or a portion thereof. A tag can also be referred to as "markup" or "metadata." "Tagging" refers to the operation of adding one or more tags to a document. A tag can be attached to a document or inserted within the document, and can refer to either the entire document or one or more designated subsets of the document content. Tags can be implemented in a number of ways, including, but not limited to, metadata content stored in the document itself, attributes attached to the document using mechanisms provided for that purpose by the file or document management system in which the document is stored (e.g., the extended attribute systems provided in many modern Unix-based file systems), or stored in a separate metadata database indexed by the particular files to which those pieces of metadata should apply.

A second aspect of the present invention addresses the problem of managing access control for documents. In conventional file systems, access control is managed on a system level. For example, the access privileges of files or folders are typically determined by rigid file attributes defined by the underlying operating system. These attributes are often inflexible and cannot be tailored to manage access control of a portion of a document. They also usually refer to the document as stored at a particular system location, and depending on the system implementation may or may not follow the document as it is moved or copied.

Embodiments of the present invention allow a user to use tags specific to a document to implement a set of access control policies. Such access control policies can be tailored for each document or a portion of a document, and can specify the users or user groups who can access the document and what type of access privileges, such as permission to open, modify, copy, or send, are available. As tags are more commonly implemented to follow the document content itself, access control tags can be expected by the user to remain with the document as it is copied or moved. Due to the flexibility of tags, the present inventive system can also implement more sophisticated access control policies based on a large variety of information. For example, a user can impose temporal constraints on access privileges, such as during what time frame can another user or user group access a document, or at what time this other user's or user group's access privilege is activated or expires.

Smarter Smart Folder

Embodiments of the present invention facilitate smarter smart folders which allow users to edit the search results in an intuitive fashion. A user can drag out of a smart folder any unwanted item which is not in the set of items the user intends locate, but matches the query nonetheless. These dragged-out items can then be precluded from reappearing in the results. Similarly, the user can drag into the folder anything that is not matched by the query but intended by the user to be included in the smart folder. The dragged-in items can be visible in that folder until the user removes them.

In one embodiment, the user can create a smart folder with an empty query, and construct its contents entirely by dragging items into the folder. Dragging an item into or out of a particular smart folder does not affect the item's visibility in any other physical or virtual location.

FIG. 1 illustrates an exemplary smarter smart folder which allows a user to drag an item into or out of the folder in accordance with one embodiment of the present invention. In this example, the system returns a set of results in response to a user query. The results are presented in a smart folder 100. The system allows a user to drag a document 102 into smart folder 100. As a result, when the user opens smart folder 100, document 102 will typically be included in folder 100. Similarly, the user can also remove a document from smart folder 100. Once a document is removed, it remains excluded from smart folder 100 until the user adds the item back.

One embodiment of the present invention employs drag-and-drop tagging to facilitate smarter smart folders. For each query and the corresponding smart folder, the system assigns to the folder two tags, namely, an IN-tag and an OUT-tag. Note that the IN-tag and OUT-tag are unique to each smart folder. The system also automatically extend the user query to include documents with IN-tags and exclude documents with OUT-tags. In one embodiment, the extended query becomes: (<original query> OR <contains IN-tag>) AND NOT <contains OUT-tag>, or, in essence, "if a document either matches the original query, or it contains the IN-tag, it matches the extended query, UNLESS it contains the OUT-tag." Documents containing the OUT-tag are excluded from the query results, even if they would have matched the original query; documents containing the IN-tag are added to the results, even if they would not have matched the original query. When the user drags and drops an item into the smart folder, indicating that that document should be added to the result set, the system determines whether the item already contains an OUT-tag. If the included item has an OUT-tag, that means the item matches the query but was previously manually excluded from the smart folder. Correspondingly, the system removes the OUT-tag from the item, verifies that it still matches the query, and then the fact that it matches the query means that it will once again appear in the results. If the item does not contain an OUT-tag, or no longer matches the query after OUT-tag removal, the system adds an IN-tag to the item.

When the user drags an item out of the smart folder, the system determines whether the item contains an IN-tag. If the excluded item has an IN-tag, that means the item does not match the query but was included in the smart folder manually. Correspondingly, the system removes the IN-tag from the item, so that the item will no longer be included. If the item does not contain an IN-tag, which means that the item originally matched the query, or if the item turns out to now match the query even after the IN-tag has been removed (e.g., because the item or the query has changed), the system adds an OUT-tag to the item, thereby excluding it from the query results.

Figure 2:
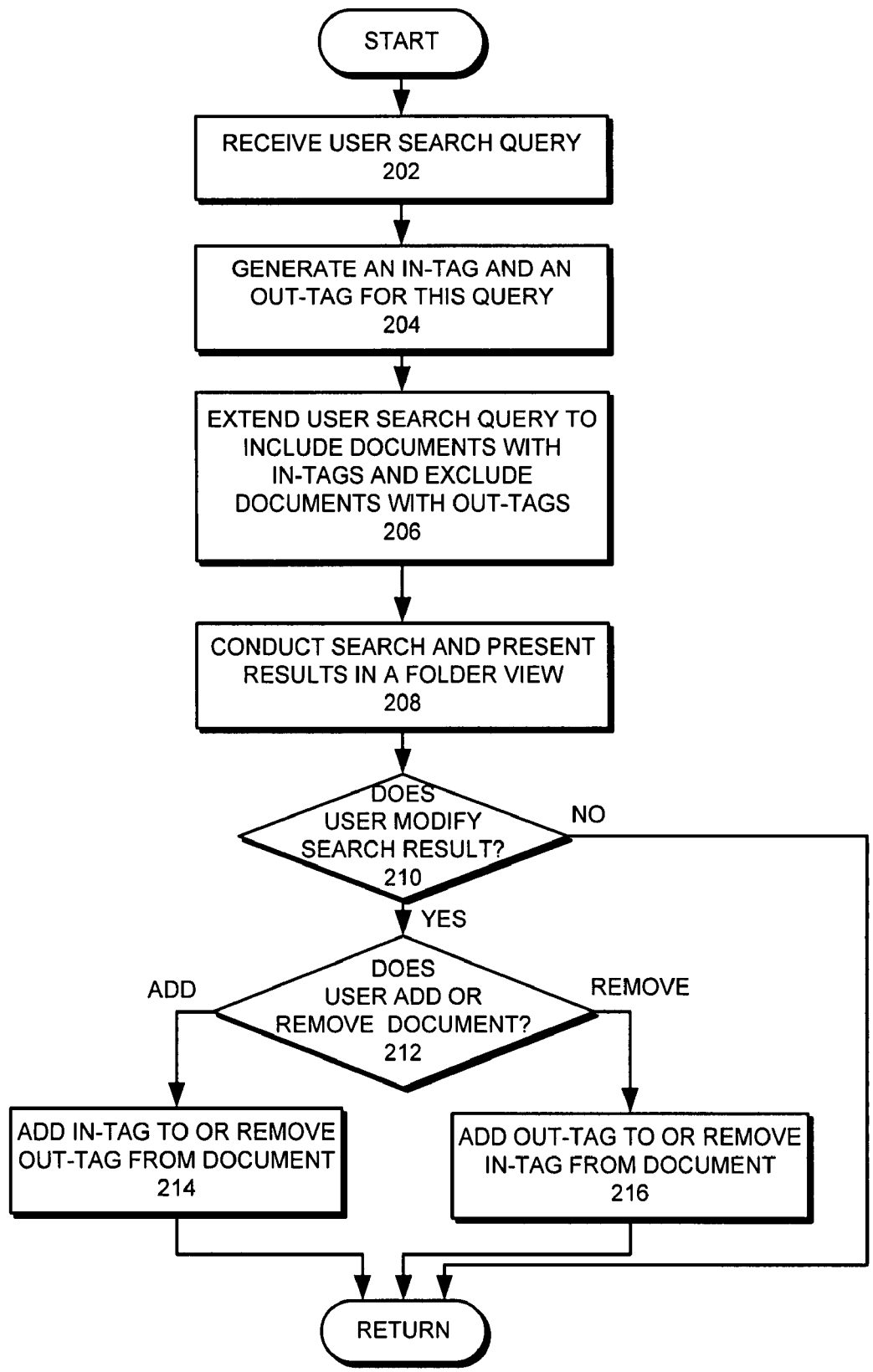
FIG. 2 presents a flowchart illustrating the process of extending a search query and tagging documents to facilitate a smarter smart folder in accordance with one embodiment of the present invention.

FIG. 2 presents a flowchart illustrating the process of extending a search query and tagging documents to facilitate a smarter smart folder in accordance with one embodiment of the present invention. During operation, the system starts by receiving a user search query (operation 202). The system then generates an IN-tag and an OUT-tag for this query (operation 204).

The system further extends the query to include documents with IN-tags and exclude documents with OUT-tags (operation 206). Subsequently, the system conducts the search and presents results in a folder view (operation 208). Next, the system determines whether the user modifies the search result (operation 210). If the user is satisfied with the search results and does not modify the results, the system returns.

Otherwise, the system further determines whether the user adds or removes a document from the search results (operation 212). Note that the user can drag and drop a document into or out of the smart folder. If the user adds a document to the results, the system adds an IN-tag to the document, if the document does not contain an OUT-tag, or removes an OUT-tag from the document, if the document contains the OUT-tag (operation 214). If the user removes a document from the results, the system adds an OUT-tag to the document, if the document does not contain an IN-tag, or removes an IN-tag from the document, if the document contains the IN-tag (operation 216). The system then returns.

In one embodiment, the system also allows a user to drag and drop one smarter smart folder (denoted as SSF2) into another smarter smart folder (denoted as SSF1). This operation represents a containment relationship, and can be treated just as if SSF2 were a regular folder contained within SSF1—a graphical representation of SSF1 will show SSF2 as a folder contained therein, which then itself contains just those documents matching SSF2. This behavior is accomplished using the representation of SSF2 itself. SSF2 will be automatically contained within SSF1 by matching its query if, for example, SSF2 itself (its name or associate metadata) matches the original query associated with SSF1. SSF2 can also be added to the result set of SSF1 by adding SSF1's IN-tag to the file system representation of SSF2 itself, typically a file containing the extended query. The fact that a file in the result set of SSF2 satisfies this two-level containment relationship with SSF1 can be determined by recursively examining the set of smarter smart folders SSF2 belongs to. More complicated relationships between any arbitrary group of smarter smart folders, and their result sets could also be specified by linking user interface actions to combinations of tags to be applied to the set of documents matching each of the smart folders so operated on.

The procedure above allows a user to start with a coarse query, or no query at all, and rapidly collect a set of desired documents by dragging and dropping documents into or out of the smart folder.

In addition to the drag-and-drop interface for manually modifying smart folder queries described here, embodiments of the present invention also allow for other means for the user to manually modify smart folder query results using IN-tags and OUT-tags. For example, if the system generates IN-tags and OUT-tags to be sensible to the end user (e.g., by deriving them from the name the user gives the smart folder), the user can also manually add content to the smart folder by using standard features of the tagging interface to directly add the IN-tag to content of their choice. Similarly, the user can also manually remove an IN-tag or OUT-tag from a document.

Tag-Based Access Control

One embodiment of the present invention facilitates document access control by allowing a user to add tags to a document to implement a variety of access control schemes. The user can specify in a tag the conditions for specific access control policies. In one embodiment, tags can take a variety of forms and provide different level of access control. For example, a tag that designates a document or a portion thereof to be "private" can cause the specified content to become readable only by the owner of the document. This provides an intuitive way of constructing a private folder. In addition, the user can also set temporal constraints to the access privileges assigned to other users or user groups.

For example, the user can tag a document as "private" to indicate that it should not be shared with others, and that she should be warned if she happens to manipulate the document in a way that would normally make it visible to others. Furthermore, a user can tag a document as "company confidential," which would allow an outbound email gateway for the company to flag any outbound email message with that document attached for further review before sending it out.

A user can also tag a document to specify which users can have what type of access to which part of the document. For example, a tag can specify "user Jane denied write to Chapter 3," which precludes user Jane from modifying Chapter 3 of the document. In another example, a tag can specify "group Students granted read to document, denied copy to document," which allows a user group called "Students" to read the document, but precludes the user group from copying the document. Or, by tagging a document with the identifier for a given group, it could be included in a set of documents to which the standard access permissions given that group apply (e.g., tagging a document "Project X Team" indicates that it is to be shared with—made readable and writable by—members of the project X team).

In one embodiment, if the user attempts to perform an operation to a document that conflicts with the access-control of that document, the system can ask her if she really wants to do so. The system can display the access-control information of the document, which offers visual feedback to remind the user of the conflict. On the other hand, the user can opt to explicitly remove the access-control tag of the document if she intends to actually proceed with the operation.

Figure 3:
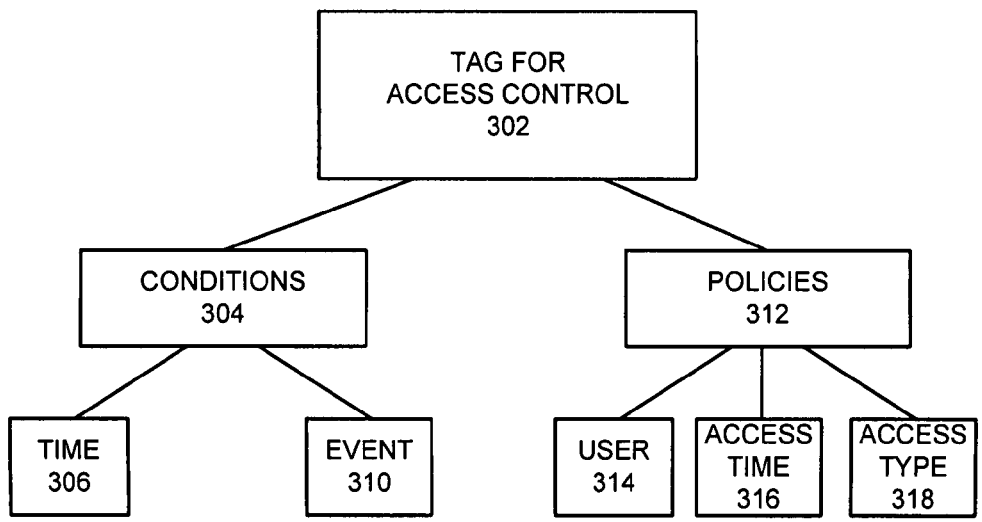
FIG. 3 presents a block diagram illustrating the construction of a tag which specifies an access control policy in accordance with one embodiment of the present invention.

FIG. 3 presents a block diagram illustrating the construction of a tag which specifies an access control policy in accordance with one embodiment of the present invention. In one embodiment, a tag for access control 302 can include two parts, a condition part 304, which can be optional, and a policy part 312. Conditions 304 specify the conditions for implementing certain access-control policies. Policies 312 specify the access-control policies, which can include certain constraints such as the type of access privileges to be assigned, temporal constraints, and/or the users/groups the policies are directed to.

In this example, conditions 304 can optionally include a time condition 306 and/or an event condition 310. Time condition 306 specifies the time at which the access control scheme is activated. For example, time condition 306 can specify a specific time, such as "0700 UTC, 15 May 2007," or a recurring time, such as "0700 UTC, every day." Event condition 310 specifies an event which triggers the access control scheme. A triggering event can be any state-change of the underlying document or computer system. For example, an event can be "user Jane has failed to enter correct password three times," or "user Jane has not logged in for two weeks."

Policy part 312 can specify the actual access-control policies to be applied. In on embodiment, this part can specify a user or user group 314, an access time 316, and an access type 318. Note that tag 302 can also specify only a portion of a document to apply the access-control policies. For example, the access control can be applied to a paragraph, a section, or a portion of a document identified by a text location.

One potential class of limitation that an access-control related tag can place on document access is that of temporal access control. That is, a tag can indicate that a document can be accessed by an individual or group only before or after a given time, or during a certain time period. Although such time-specific controls have been available in other contexts such as network security (e.g., as constraints on when a given user can remotely access a network) or digital rights management (e.g., as indications when a user's subscription to particular content begins or ends), tags have not previously been suggested as a flexible indicator of such controls which are applied to a given document or document portion.

Furthermore, temporal access controls have not been previously available directly to end users. Instead, such controls are usually available only to administrators, as with controls over remote network access that allow an administrator to specify that users may connect to a network only during working hours, or to content providers, as in Digital Rights Management systems that temporally limit access to content according to a subscription model (where access begins or ends at designated times) or more complex policies (e.g., control over the number of times content can be accessed). Temporal access controls may also be applied by administrators to manage membership in groups to which other access control rules apply. For example, an individual's group membership is indicated by possession of a valid digital certificate, which has a designated start and end date for validity. Furthermore, a group's existence can be limited by the start and end dates on the Certification Authority's certificate used to issue member certificates.

Instead, the access controls available to end users are considerably more limited, allowing only the specification of an access policy for a given user or group. That policy then remains effective until manually altered. Embodiments of the present invention extend the mechanisms available to specify such access controls to include the use of tags attached to documents or portions thereof. The controls afforded by these tags can be arbitrarily complex, now allowing users to take advantage of functions such as temporal- or count-based controls (e.g., "Bob can read this document only once"), which previously were available only to administrators. Because the interpretation and enforcement of such tags are typically mediated by a piece of high-level software, the policies available to be specified with tags can be extensible over the life of the system.

The aforementioned count-based access controls can be implemented by using tags. That is, based on the content of a tag, a given individual or group can access a document only one or a specified number of times. Single-use access can be highly useful, for example when a user wants to limit the number of copies made to a confidential document without providing ongoing access to that document.

Figure 4:
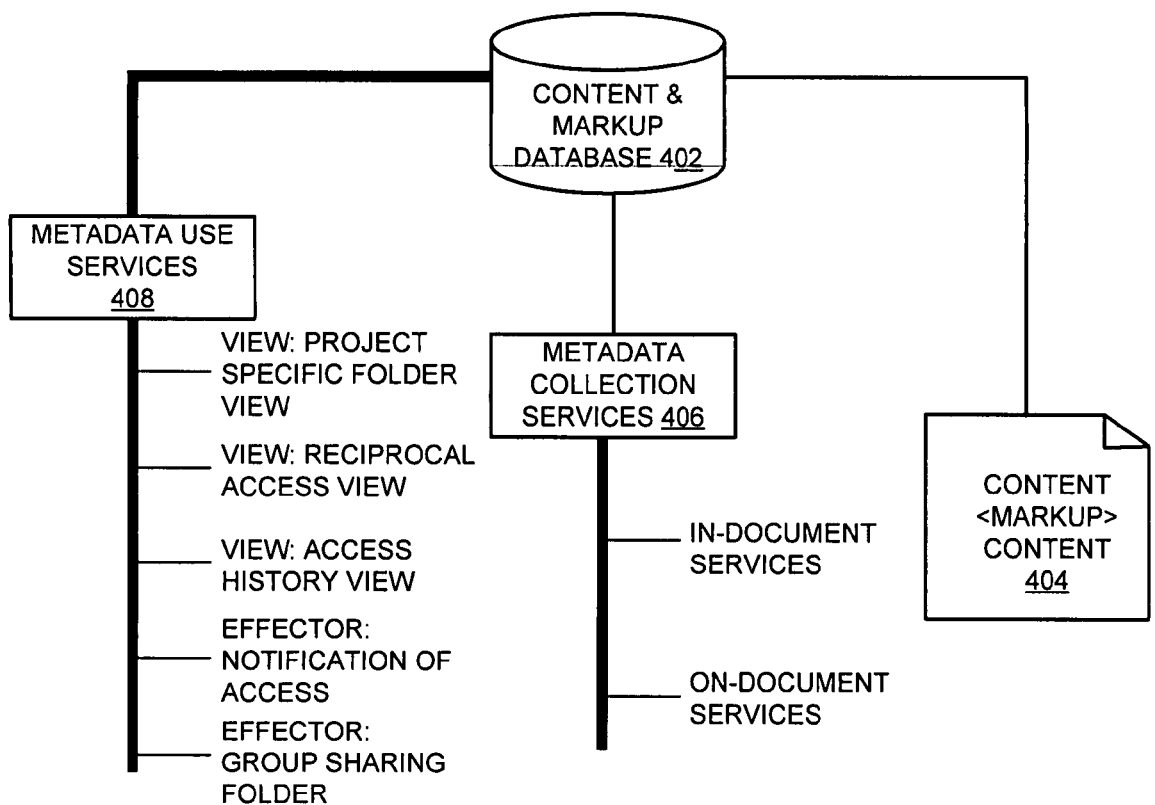
FIG. 4 presents an exemplary architecture that facilitates tag-based access control in accordance with one embodiment of the present invention.

FIG. 4 presents an exemplary architecture that facilitates tag-based access control in accordance with one embodiment of the present invention. In one embodiment, the system includes a content and markup database 402. A piece of content 404 which includes tags (markup) can be stored in content and markup database 402.

A set of metadata collection services 406 are operated in conjunction with content & markup database 402 to collect document information. This information can then be used by a user to construct access-control tags. Note that metadata collection services 406 can be used to collect both in-document information (referred to as in-document services) and on-document information (i.e., information not embedded in the document, referenced to as on-document services).

Also operating in conjunction with content & markup database 402 is a set of metadata use services 408. These services can be used to perform operations specified by tags. In one embodiment, meta-data use services 408 can be used to create a variety of views of documents, such as project specific folder views, reciprocal access views, and access history views. In addition, the meta-data use services 408 can effectuate notification of access to a document and group-sharing folders.

Figure 5:
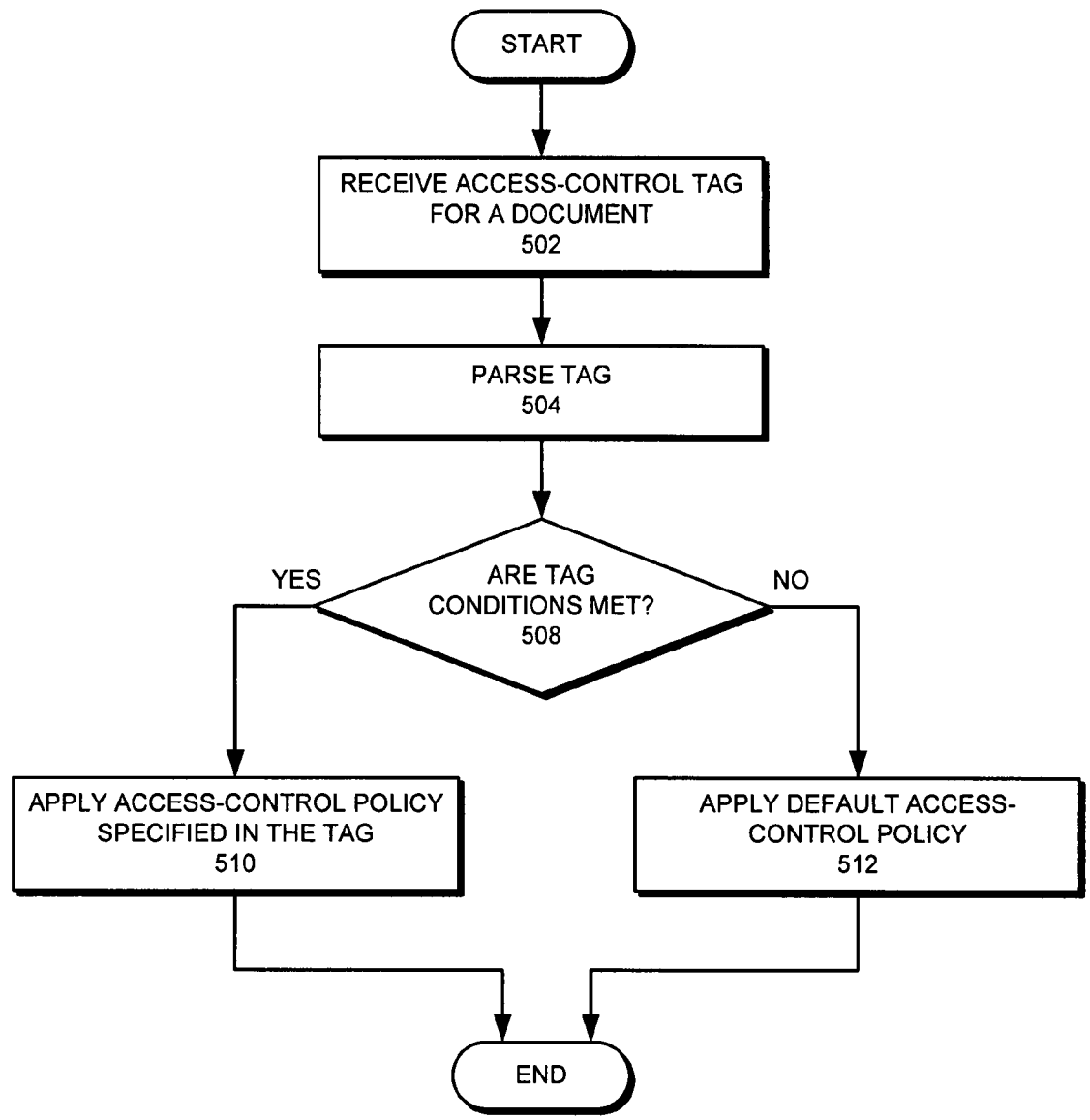
FIG. 5 presents a flowchart illustrating the process of implementing tag-based access control in accordance with one embodiment of the present invention.

FIG. 5 presents a flowchart illustrating the process of implementing tag-based access control in accordance with one embodiment of the present invention. During operation, the system receives an access-control tag for a document (operation 502). The system then parses the tag (operation 504).

Subsequently, the system determines whether the conditions specified by the tag are met (operation 508). These conditions might consist of the user or group the access control tag is intended to apply to, or any time, event or action constraints placed by the tag. If there is a match, the system applies the access-control policy specified by the tag for the set of conditions that are matched (operation 510) (e.g. if the tag grants access to user Les between 5 and 7 pm and denies him access otherwise, and the user attempting to access the document is Les, access is granted if the time is between 5 and 7 pm and denied otherwise). If the conditions specified in the tag are not met, i.e., no set of tag conditions apply to the current access situation, the system applies a set of default access-control policies (operation 512). These may include standard access control policies applied to the document such as those provided by the file or content management system in which the document is stored.

Figure 6:
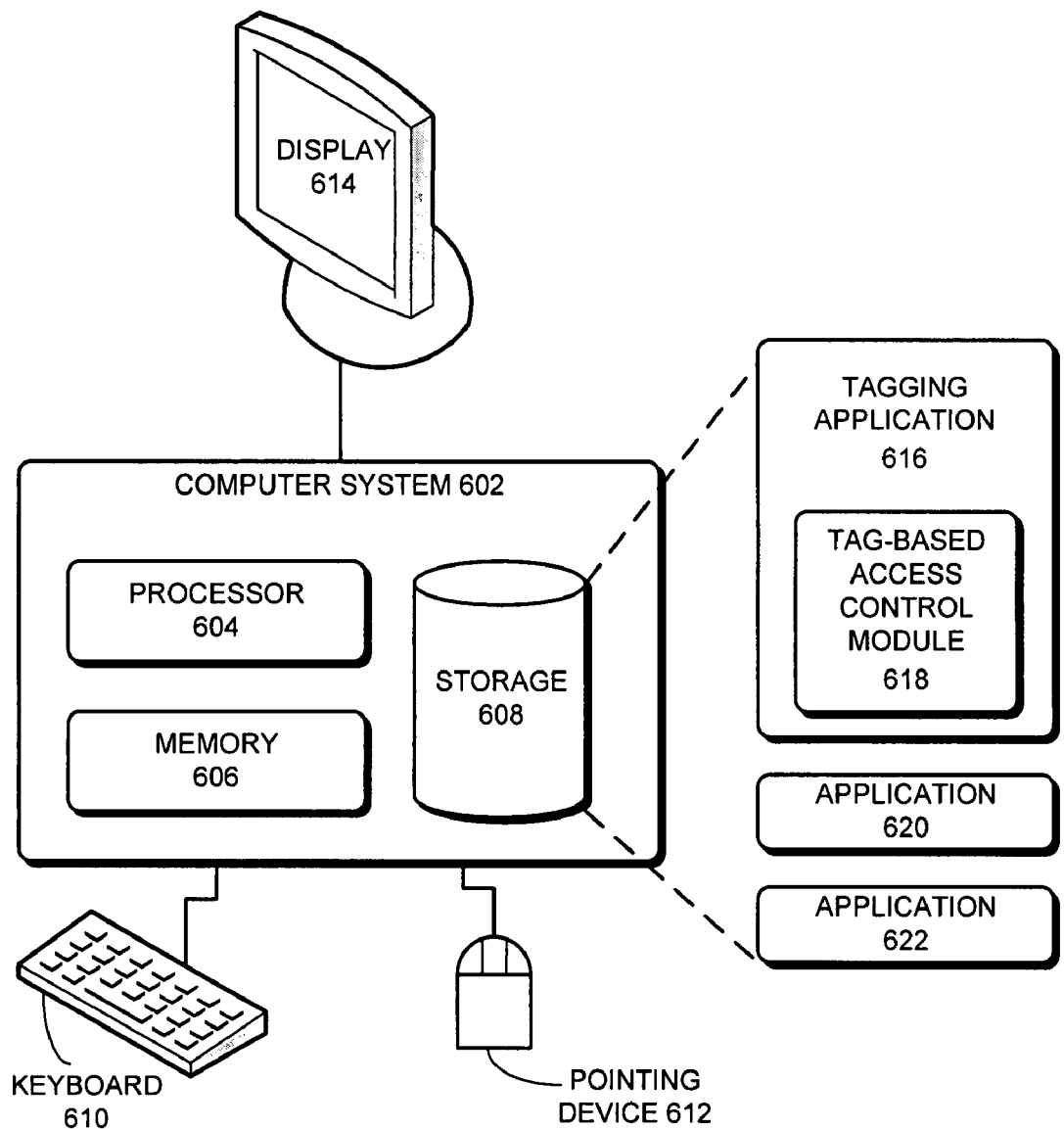
FIG. 6 illustrates an exemplary computer system that facilitates smarter smart folders and tag-based access control in accordance with one embodiment of the present invention.

FIG. 6 illustrates an exemplary computer system that facilitates smarter smart folders and tag-based access control in accordance with one embodiment of the present invention. A computer system 602 includes a processor 604, a memory 606, and a storage device 608. Computer system 602 is coupled to a display 614, a keyboard 610, and a pointing device 612.

Storage device 608 stores a tagging application 616, as well as applications 620 and 622. Tagging application 616 includes a tag-based access control module 618, which facilitates in-document, tag-based access control by a user. During operation, tagging application 616 is loaded into memory 606. Processor 604 executes in-document tagging application 616 to allow a user to create smart folders and modify smart folders by dragging and dropping documents. Furthermore, processor 604 also executes tag-based access control module 618 to enforce the access-control schemes specified by the tags.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating tag-based organization of documents, the method comprising:
    receiving an original user query in a computer system;
    generating an IN-tag and an OUT-tag for the received query, wherein the generated IN-tag and the generated OUT-tag are associated only with a smart folder that includes documents associated with results of the received query; and
wherein the generated IN-tag and the generated OUT-tag are unique to the smart folder;
    extending the query to include, in the smart folder, documents which are tagged with an IN-tag associated with the generated IN-tag, and exclude documents which are tagged with an OUT-tag associated with the generated OUT-tag;
    performing a search for a collection of documents based on the extended query;
    providing a user at the computer system with an interface to add a document to or remove a document from the collection of documents; and
    modifying a tagging property of the document at the computer system.

2. The method of claim 1,
    wherein if the user adds the document to the collection and if the document satisfies the original query, modifying the tagging property of the document comprises removing an OUT-tag from the document.

3. The method of claim 1,
    wherein if the user adds the document to the collection and if the document does not satisfy the original query, modifying the tagging property of the document comprises including an IN-tag in the document.

4. The method of claim 1,
    wherein if the user removes the document from the collection and if the document satisfies the original query, modifying the tagging property of the document comprises including an OUT-tag in the document.

5. The method of claim 1,
    wherein if the user removes the document from the collection and if the document does not satisfy the original query, modifying the tagging property of the document comprises removing an IN-tag in the document.

6. A non-transitory computer-readable storage medium storing instructions that when executed by a computer cause the computer to perform a method for facilitating tag-based organization of documents, the method comprising:
    receiving an original user query in a computer system;
    generating an IN-tag and an OUT-tag for the received query, wherein the generated IN-tag and the generated OUT-tag are associated only with a smart folder that includes documents associated with results of the received query; and
wherein the generated IN-tag and the generated OUT-tag are unique to the smart folder;
    extending the query to include, in the smart folder, documents which are tagged with an IN-tag associated with the generated IN-tag, and exclude documents which are tagged with an OUT-tag associated with the generated OUT-tag;
    performing a search for a collection of documents based on the extended query;
    providing a user at the computer system with an interface to add a document to or remove a document from the collection of documents; and modifying a tagging property of the document at the computer system.

7. The storage medium of claim 6,
wherein if the user adds the document to the collection and if the document satisfies the original query, modifying the tagging property of the document comprises removing an OUT-tag from the document.

8. The storage medium of claim 6,
wherein if the user adds the document to the collection and if the document does not satisfy the original query, modifying the tagging property of the document comprises including an IN-tag in the document.

9. The storage medium of claim 6,
wherein if the user removes the document from the collection and if the document satisfies the original query, modifying the tagging property of the document comprises including an OUT-tag in the document.

10. The storage medium of claim 6,
wherein if the user removes the document from the collection and if the document does not satisfy the original query, modifying the tagging property of the document comprises removing an IN-tag in the document.

\* \* \* \* \*